Figures 1, 2:
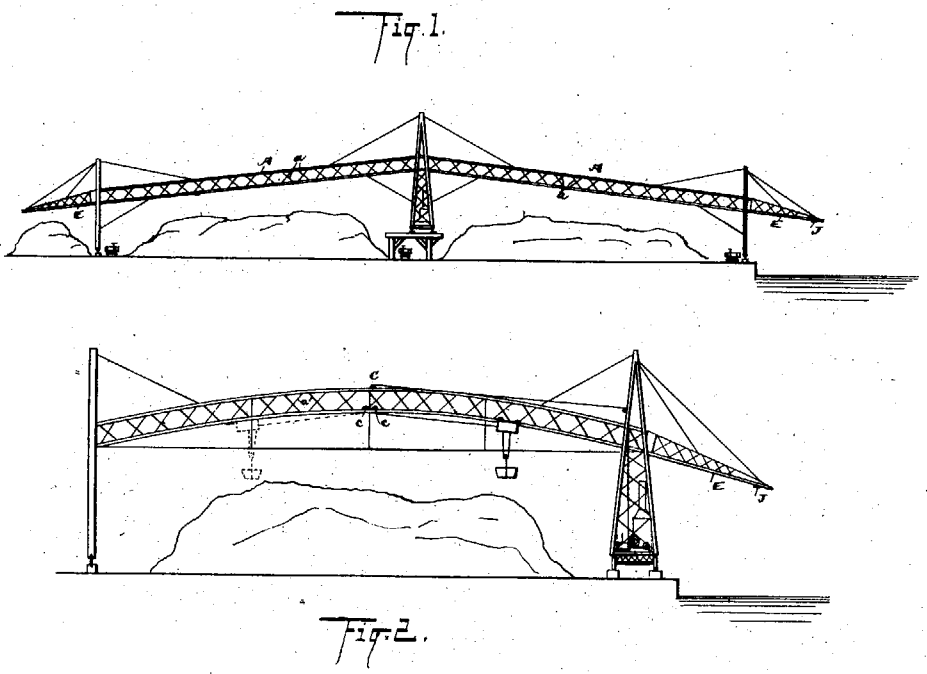

(No Model.)

4 Sheets—Sheet 1.

F. MURGATROYD.

HOISTING AND CARRYING MECHANISM.

No. 10,833. Reissued May 3, 1887.

WITNESSES

N. S. Amstutz

Geo. W. King

Frank Murgatroyd INVENTOR

By Siggett & Siggett Attorneys (No Model.)

4 Sheets—Sheet 2.

F. MURGATROYD.

HOISTING AND CARRYING MECHANISM.

No. 10,833. Reissued May 3, 1887.

WITNESSES

N. S. Amstutz

Geo. W. Gill

Frank Murgatroyd INVENTOR

By Liggett & Liggett

Attorneys (No Model.) 4 Sheets—Sheet 3.

F. MURGATROYD.

HOISTING AND CARRYING MECHANISM.

No. 10,833. Reissued May 3, 1887.

WITNESSES
N. S. Amstutz
Geo. W. King

Frank Murgatroyd INVENTOR
By
Seggett & Seggett
Attorneys (No Model.)
4 Sheets—Sheet 4.
F. MURGATROYD.
HOISTING AND CARRYING MECHANISM.
No. 10,833. Reissued May 3, 1887.
Fig. 12.
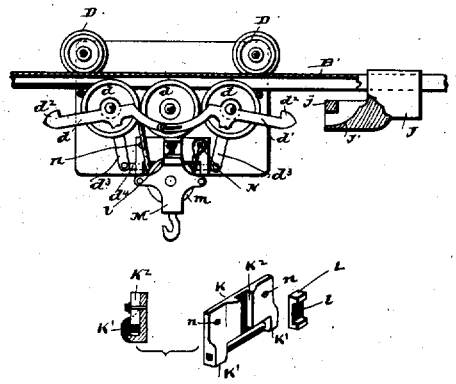
Fig. 13.
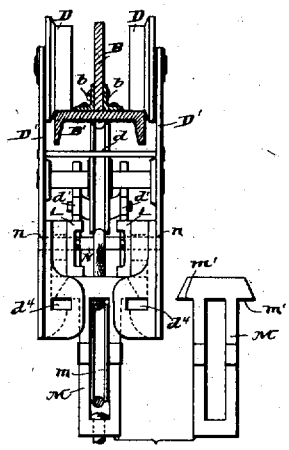
Fig. 14.
Fig. 15.
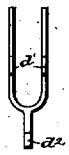
WITNESSES
N. S. Amstutz
Geo. W. King
Frank Murgatroyd INVENTOR
By
Siggett & Siggett Attorneys

UNITED STATES PATENT OFFICE.

FRANK MURGATROYD, OF CLEVELAND, OHIO.

HOISTING AND CARRYING MECHANISM.

SPECIFICATION forming part of Reissued Letters Patent No. 10,833, dated May 3, 1887.

Original No. 355,884, dated January 11, 1887. Application for reissue filed February 15, 1887. Serial No. 227,752.

*To all whom it may concern:*

Be it known that I, FRANK MURGATROYD, of Cleveland, in the county of Cuyahoga and State of Ohio, have invented certain new and useful Improvements in Mechanism for Hoisting and Transmitting Freight, Coal, Ores, &c.; and I do hereby declare the following to be a full, clear, and exact description of the invention, such as will enable others skilled in the art to which it pertains to make and use the same.

My invention relates to improvements in mechanism for hoisting and transmitting freight, coal, ores, &c., in which is employed an arched or double-inclined truss, as the case may be, for supporting the tramway for the carrier, the highest point of the truss being in the center, with the cable that operates the carrier passing over and down between sheaves at the highest or central part of the truss, to enable the cable to operate in both directions in drawing the carrier upgrade, while on the downgrade in either direction the carrier descends by gravity, to the end that with such construction less slack cable is had than where a continuous grade is had from one end of the truss to the other, as heretofore used, and, consequently, having less slack cable, there is less resistance offered to the carrier in its travel over the downgrade. In order that, with the least material practicable, the truss may be made to sustain its load, and also resist lateral strain—such, for instance, as caused by high winds moving the truss laterally, &c.—the truss is made with three chords, two of which are arranged at the top and one below, with brace-rods, in the form of lattice-work, extending from one chord to another, so that the entire structure in transverse section is in the form of an inverted hollow triangle. A boom is provided at one end of the truss, that is hinged in such a manner that it may be tilted to an upright position, and when lowered to its normal position may be swung laterally a limited distance, in which latter position no obstruction is had to the carrier from the boom to the truss, or vice versa.

Figure 3:
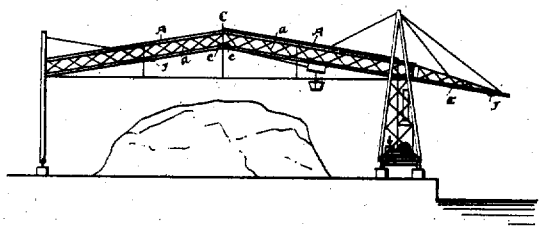
Figure 4:
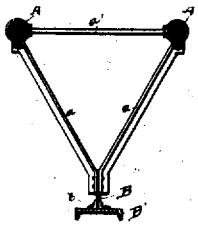
Figure 5:
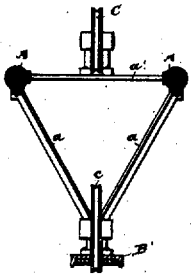
Figure 6:
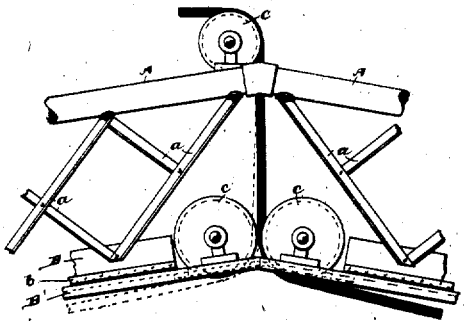
Figure 7:
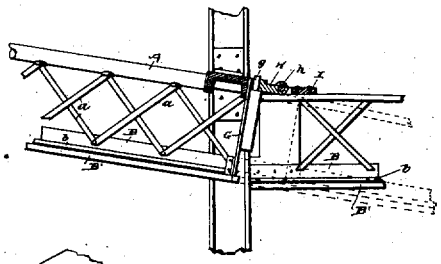
Figure 11:
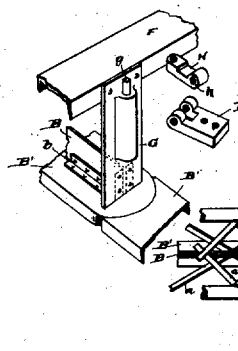
Figure 8:
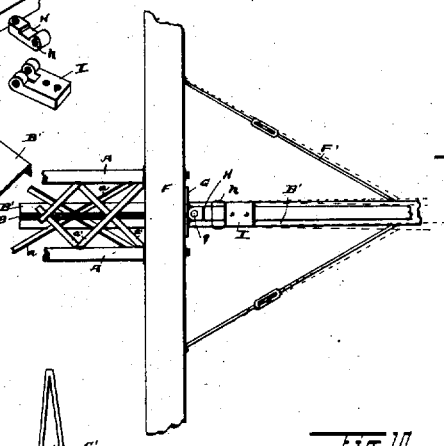
Figure 9:
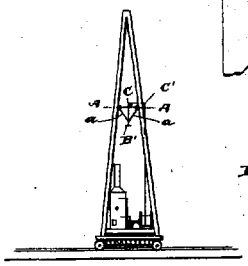
Figure 10:
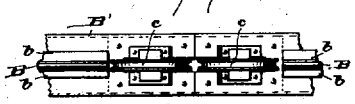

In the accompanying drawings, Figs. 1, 2, and 3 are side elevations of trusses respectively embodying my invention, the first being a truss with a double incline, and having a supporting-tower and hoisting-engine located at the center thereof. The second shows an arched truss with the hoisting-engine at one end. The third shows a double-inclined truss with the engine located at one end. Figs. 4 and 5 are elevations in transverse section of the truss, the one showing sheaves at the center of the truss, over which the cable passes. Fig. 6 is a side elevation of the sheaves shown in Fig. 5. Figs. 7 and 8 are respectively a side elevation and plan, illustrating more especially the manner of hinging the boom. Fig. 9 is an end elevation showing the manner of arranging the cable and sheaves where the hoisting-engine is located at the center of the truss. Fig. 10 is a plan of the sheaves shown in Fig. 6. Fig. 11 shows details illustrating the parts shown in Figs. 7 and 8. Fig. 12 is a side elevation in section of the carrier, the one side plate being removed. Fig. 13 is an enlarged view in perspective and section of details of the carrier hereinafter described. Fig. 14 is an enlarged end elevation of the carrier. Fig. 15 is a plan of a lever, *d'*.

The truss, which may be of either of the varieties shown, respectively, in Figs. 1, 2, and 3, is constructed with three chords, the two chords A being arranged at the top and separated, as shown, with a chord, B, located at the bottom. (See Fig. 4.) The upper chords may be of any desired form in cross-section; but I prefer the well-known tubular variety shown. The lower chord, B, is preferably a metal plate set edgewise. Braces *a* and *a'* connect the chords in the usual manner. To the lower edge of the plate are riveted angle-irons *b*, and to the latter is riveted the plate B', the latter lying flatwise and the edges thereof forming tracks for the carrier-wheels. The plate B' may be an ordinary channel-iron, made with depending ribs at the edges to stiffen the same, or may have angle-irons riveted thereto for the purpose. (See Fig. 5.) With this triangular form of truss great strength is had, not only to carry the load, but to withstand lateral strains, and it is believed that it can be built with less weight of material than any of the forms heretofore used.

In case the hoisting-engine is located at one end of the truss, as shown in Figs. 2 and 3, the cable may be carried over the top of the truss to the center or highest point thereof, where it passes over a sheave, C, and down between the sheaves $c$. If the engine is at the center, as shown in Fig. 1, the sheave C is turned crosswise, as shown in Fig. 9, and another sheave, C′, is placed in position to pass the cable up outside of the truss, or far enough laterally to miss the carrier and bucket. The cable, after passing between the sheaves $c$, may lead in either direction, and is made to draw the carrier up the inclines in either direction. The momentum of the carrier will cause it to pass the apex, after which it descends by gravity down either incline.

From the fact that the cable is sustained by the sheaves at the center of the truss, only half the length of slack cable is had to operate against the descent of the carrier as would be had if the incline were continued from one end of the truss to the other.

The carrier is substantially the same as shown and described in Letters Patent No. 279,264, granted to me June 12, 1883, but is modified, as hereinafter shown, to operate upgrade in either direction.

The arrangement of the boom E is believed to be novel, and is as follows: A cross-bar, F, is secured to two chords, A, and extends some distance laterally for attaching the guy-rod of the boom. To the center of the cross-bar F is attached the upper end of the casting G, the lower end of the latter being attached to the end of the chord B, usually by means of angle-irons secured in the corners. A strong upright pin or king-bolt, $g$, is secured in the upper end of the casting G, and on this pin is pivoted the strap H. This strap in turn is pivoted at $h$ to the strap I, the axis of this joint extending laterally. The strap I is attached to the top side of the boom. With this construction, by means of the hinge-joint at $h$, the boom may be tilted and brought to an upright position, out of the way, for instance, of passing vessels; and by means of the strap H being pivoted on the pin $g$ the boom may be swung laterally. The track-plates B′ of the truss and boom abut together on a curved line, (see Fig. 11,) the axis of which is in line with the axis of the pin $g$.

The boom is usually fifteen or twenty feet long, and by loosening one guy-rod, F′, and tightening the other guy-rod the free end of the boom may be turned a foot or two in either direction, to bring the end thereof more directly over the hatchway of the vessel. Such limited lateral movement of the boom, however, causes so slight an angle at the joint of the plates B′ that no obstruction is had to the carrier in passing this point.

Any towers, piers, frame-work, or structure, such as usually employed in this class of work, may be had for supporting my improved truss and tracks, and mechanism for moving the truss laterally may be employed, the same as with other structures of this class.

The carrier, with wheels D for traveling on the track, is constructed with side plates, D′, through which studs pass, on which latter are pivoted the sheaves $d$—three in number. On the outside studs are pivoted the levers $d'$, arranged in pairs astride the respective sheaves, the projecting ends of each pair of levers being joined together or made integral and terminating in a hook end, $d^2$, for engaging, respectively, catches $j$ of the movable block or stop J, the latter being movable along the track and are secured, respectively, at the hoisting and dumping point. The levers $d'$ have, respectively, depending arms $d^3$, to the lower ends of which are pivoted push-levers $d^4$, the latter lying in a horizontal position and extending lengthwise of the carrier, the free ends of the two push-bars on the same side of the carrier presenting toward each other. Castings K are secured on the inside of the respective plates D′, and facing each other. These castings have loops K′, forming ways through which the free ends of the push-bars pass loosely, by means of which the push-bars are held substantially in a horizontal position.

Broad vertical channels $K^2$ are made on the inner faces of the castings K and form seats for the blocks L, the latter fitting loosely, so that they may move in a vertical direction, each block having an elongated hole, $l$, through which the securing-bolt passes, the elongation being sufficient to accommodate the limited vertical movement required. When the blocks are elevated, they engage the inner ends of the levers $d'$, and tilt the latter, causing the hook ends $d^2$ to be depressed, so as to relieve them from their engagement with the catches $j$.

The blocks J have inclines J′, for elevating the hook ends $d^2$ as the latter enter these blocks, some lost motion being allowed endwise, so that the hooks can drop away from the catch. The cable is arranged as shown in Fig. 12, passing down between two sheaves, $d$, the third sheave serving only as a carrier for the cable when the load has passed the central point of the truss, when of course the cable leads over this (otherwise idle) sheave. The cable passes next under the sheave $m$ of the hoisting-block M, thence up to a pin, N, where it is secured, the pin N passing through holes in the side plates, D′.

In operating the device, suppose a hook end, $d^2$, engages the catch $j$, located at the place where the elevating is done. Such engagement will hold the carrier from moving along the track, and the draft of the cable will elevate the load. As the hoisting-block strikes the blocks L the latter are elevated, and these blocks in turn tilt the levers $d'$ and release the hook end $d^2$, after which, as the hoisting-block cannot be drawn farther upward, the carrier is moved along the track. The tilting of the levers $d'$, as just described, thrusts the free end of the push-bars $d^4$ under the shoulders $m'$ of the hoisting-block, and holds it elevated until the dumping-point is reached, where the other hook end $d^2$ is elevated and engages the other catch $j$, located at this point, by means of which the push-bars are drawn from under the shoulders $m'$, and the load is allowed to descend as the cable is slacked off from the engine.

As the end sheave, $d$, over which the cable draws in elevating the load, has more labor to perform than the other sheaves $d$, the journal of this sheave will be sooner worn, and at any time the carrier may be changed end for end on the track and the cable passed between the other sheaves $d$, extra holes $n$ having been made through the plates D′ for changing the pin N, on which the cable is fastened.

What I claim is—

1. In mechanism for hoisting and transmitting freight, coal, ores, &c., a truss in cross-section made in the form of an inverted hollow triangle, with the three chords located, respectively, at the angles, the lower chord carrying a track, on which the car or carriage travels, substantially as set forth.

2. The combination, with a truss triangular in cross-section and carrying a track, on which a carrier travels, said truss and track having its highest point at the central portion thereof, of a cable for operating the carrier, and sheaves located at the highest part of the track and arranged, substantially as described, for the passage of the cable, whereby the latter is made to operate the carrier from either direction.

3. The combination, with a truss triangular in cross-section and provided with a track, on which the carrier travels, of a boom pivoted to the end of the truss, so as to swing laterally, and hinged so as to tilt to an upright position, the parts being arranged substantially as set forth.

4. The combination, with a truss and track attached for operating the carrier, said track having a double incline descending toward the respective terminus, of a cable for operating the carrier, and sheaves arranged at the summit of the track for supporting the cable, and arranged, substantially as described, for drawing the carrier upgrade from either direction.

5. The combination, with a double-inclined track, a carrier, and a cable for operating the latter from the summit of the track, of movable stops secured to the track respectively at the desired hoisting and lowering point, substantially as set forth.

6. The combination, with a track on which the carrier travels, of a boom pivoted to the end of the track and forming a continuation of the same, the said boom adapted to swing laterally, and also provided with a hinge-joint to enable it to tilt vertically.

In testimony whereof I sign this specification, in the presence of two witnesses, this 1st day of February, A. D. 1887.

FRANK MURGATROYD.

Witnesses:

CHAS. H. DORER,
GEO. W. KING.